United States Patent
Rozman et al.

(10) Patent No.: US 9,573,539 B2
(45) Date of Patent: Feb. 21, 2017

(54) ELECTRIC SYSTEM ARCHITECTURE FOR MORE-ELECTRIC ENGINE ACCESSORIES

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Lubomir A. Ribarov, West Hartford, CT (US)

(73) Assignee: Hamilton Sundstrand Corporation, Windsorlocks, CT (US)

( * ) Notice: Subject to any disclaimer, the term of this patent is extended or adjusted under 35 U.S.C. 154(b) by 178 days.

(21) Appl. No.: 14/461,927

(22) Filed: Aug. 18, 2014

(65) Prior Publication Data
US 2016/0046247 A1    Feb. 18, 2016

(51) Int. Cl.
| H02P 9/00 | (2006.01) |
|---|---|
| B60R 16/03 | (2006.01) |
| H02P 9/30 | (2006.01) |
| H02K 7/18 | (2006.01) |

(52) U.S. Cl.
CPC ............ *B60R 16/03* (2013.01); *H02K 7/1823* (2013.01); *H02P 9/302* (2013.01); *H02P 9/307* (2013.01)

(58) Field of Classification Search
CPC ....... B60R 16/03; H02K 7/1823; H02P 9/302; H02P 9/307
See application file for complete search history.

(56) References Cited

U.S. PATENT DOCUMENTS

| 4,663,581 A * | 5/1987 | Glennon ............... H02K 16/00 310/114 |
|---|---|---|
| 8,237,416 B2 | 8/2012 | Rozman et al. |
| 8,319,369 B2 | 11/2012 | Rozman et al. |
| 2004/0090204 A1* | 5/2004 | McGinley ............. B60K 25/00 318/767 |
| 2008/0238098 A1* | 10/2008 | Becquerelle ......... H02K 11/042 290/3 |
| 2009/0251112 A1* | 10/2009 | Gieras ...................... H02K 3/20 322/25 |
| 2009/0261586 A1* | 10/2009 | Maddali .................. H02P 9/305 290/6 |
| 2010/0170983 A1 | 7/2010 | Fervel et al. |
| 2010/0181969 A1* | 7/2010 | Gieras .................. H02K 21/046 322/59 |

(Continued)

FOREIGN PATENT DOCUMENTS

| EP | 2670045 A2 | 12/2013 |
|---|---|---|
| EP | 2677618 A2 | 12/2013 |

OTHER PUBLICATIONS

Extended European Search Report for European Application No. 151809902, dated Jan. 27, 2016, 6 Pages.

*Primary Examiner* — Tulsidas C Patel
*Assistant Examiner* — S. Mikailoff
(74) *Attorney, Agent, or Firm* — Kinney & Lange, P.A.

(57) ABSTRACT

An electric system and method includes a flux regulated permanent magnet generator configured to provide power for an accessory electric system. The accessory electric system includes an engine accessory and a voltage regulator. The engine accessory includes an induction motor that receives power from the flux regulated permanent magnet generator. The voltage regulator is configured to control an output of the flux regulated permanent magnet generator to maintain a constant voltage-to-frequency ratio.

15 Claims, 2 Drawing Sheets

(56) References Cited

U.S. PATENT DOCUMENTS

| | | | | |
|---|---|---|---|---|
| 2011/0133703 A1* | 6/2011 | Rozman | ............... | H02K 19/34 322/59 |
| 2011/0285202 A1* | 11/2011 | Rozman | ............... | H02J 1/10 307/23 |
| 2012/0013177 A1* | 1/2012 | Krenz | ............... | H02J 4/00 307/9.1 |

* cited by examiner

ELECTRIC SYSTEM ARCHITECTURE FOR MORE-ELECTRIC ENGINE ACCESSORIES

BACKGROUND

The present invention relates generally to more-electric engines (MEE) and particularly to an electric system architecture for a MEE.

Electrical system architecture for gas turbine engines, such as the one described in U.S. Pat. No. 8,237,416, have recently been developed to provide electrical power to loads associated with, for example, an aircraft carrying the gas turbine engine. These loads include, for example, motor driven fuel pumps and oil pumps. In order to achieve fault tolerant operation for flight critical functions, the electrical system architecture may include a dual direct current (DC) or alternating current (AC) bus that powers multiple dual-redundant motor controllers. These motor controllers drive permanent magnet motors with, for example, dual stator windings and may include switching mode power converters. In order to meet stringent conducted and radiated emissions requirements, electromagnetic interference (EMI) filters are often implemented to attenuate the noise created by these switching mode power converters. The weight and size of the motor controllers is aggravated by the need for these EMI filters. There is a need to improve electrical system architecture for gas turbine MEEs to reduce or eliminate the need for complex motor controllers in order to reduce the size and weight of the MEE electrical system.

SUMMARY

An electric system includes a flux regulated permanent magnet generator configured to provide power for an accessory electric system. The accessory electric system includes an engine accessory and a voltage regulator. The engine accessory includes an induction motor that receives power from the flux regulated permanent magnet generator. The voltage regulator is configured to control an output of the flux regulated permanent magnet generator to maintain a constant voltage-to-frequency ratio.

A method includes driving, by a gas turbine, a flux regulated permanent magnet generator and providing, by the flux regulated permanent magnet generator, output power to a plurality of engine accessories. The output power has a power frequency and a power voltage. The method also includes controlling, using a voltage regulator, the power voltage of the flux regulated permanent magnet generator to maintain a constant ratio between the power voltage and the power frequency.

DETAILED DESCRIPTION

A system and method is disclosed herein that provides power for both aircraft loads and engine accessories. The system includes two electrical generators driven by, for example, an aircraft speed reducing gearbox. The generators include a wound field synchronous generator (WFSG) and a flux regulated permanent magnet generator (FRPMG). The WFSG provides constant voltage variable frequency (CVVF) power to, for example, aircraft loads. The FRPMG provides two variable voltage variable frequency (VVVF) buses to power, for example, induction motors for engine accessories. A voltage regulator may be utilized to control the output voltage of the FRPMG based upon sensed voltage and current on the VVVF buses. In this way, a constant voltage-to-frequency (V/Hz) ratio may be maintained on the VVVF buses, eliminating the need for motor controllers for each of the induction motors. By eliminating the need for motor controllers, the weight of the system may be reduced and the overall efficiency of the electrical system may be increased.

Figure 1:
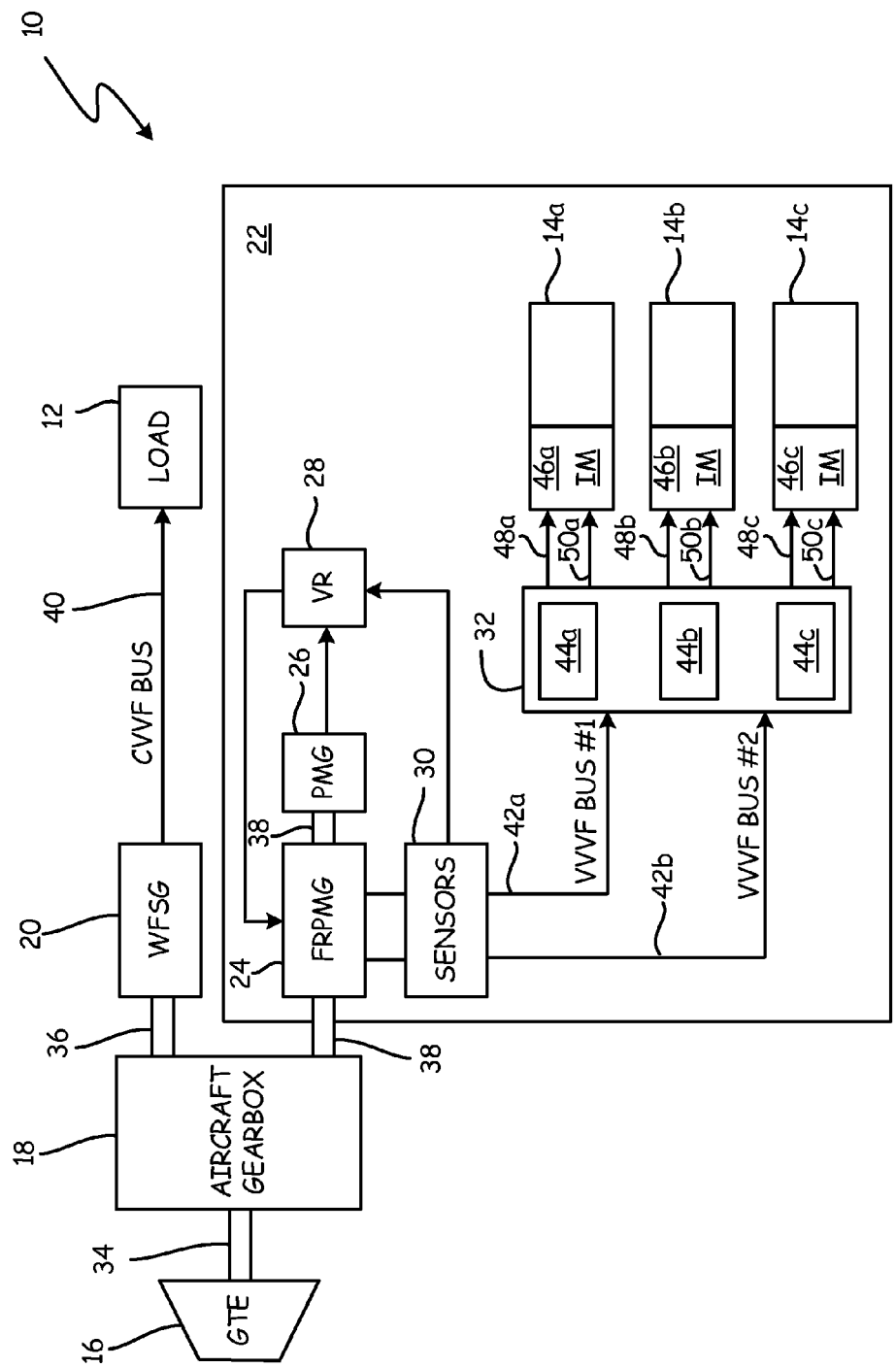
FIG. 1 is a block diagram that illustrates an electric system for powering loads and engine accessories.

FIG. 1 is a block diagram illustrating electric system 10 for powering loads 12 and engine accessories 14a-14c. Electric system 10 includes loads 12, prime mover 16, gearbox 18, wound field synchronous generator (WFSG) 20, and engine accessories electric system 22. Engine accessories electric system 22 includes engine accessories 14a-14c, flux regulated permanent magnet generator (FRPMG) 24, permanent magnet generator (PMG) 26, voltage regulator 28, sensors 30, and load management and distribution (LMD) module 32.

Prime mover 16 is utilized to drive both WFSG 20 and FRPMG 24 through shaft 34 and gearbox 18. Although illustrated in FIG. 1 as a gas turbine engine, prime mover 16 may be implemented as any prime mover. Gearbox 18 may be, for example, an aircraft speed reducing gearbox. Shaft 36 is driven by gearbox 18 to drive WFSG 20 and shaft 38 is driven by gearbox 18 to drive FRPMG 24. Constant voltage variable frequency (CVVF) power is provided from WFSG 20 to loads 12 on CVVF bus 40. Loads 12 are any loads and may be, for example, loads onboard an aircraft carrying prime mover 16. Variable voltage variable frequency (VVVF) power is provided from FRPMG 24 to LMD module 32 on VVVF buses 42a and 42b. In the embodiment illustrated in FIG. 1, LMD module 32 includes solid state power controllers (SSPCs) 44a-44c. Engine accessories 14a-14c include respective induction motors (IMs) 46a-46c. Power is provided to IMs 46a-46c through respective redundant power inputs 48a-48c and 50a-50c. Engine accessories 14a-14c are any accessories that are driven by electromechanical means, such as, for example, fuel pumps or oil pumps. Although illustrated as three engine accessories 14a-14c, system 10 may include any number of engine accessories.

Voltage regulator 28 is configured to control the output voltage of FRPMG 24 provided on VVVF buses 42a and 42b. FRPMG 24 allows for active electromagnetic regulation of magnetic flux present in FRPMG 24 to control electrical power generation without dependence upon control of the rotational speed of the components of FRPMG 24. Voltage regulator 28 controls the output of FRPMG 24 using any desirable control method. For example, in an embodiment, voltage regulator 28 may apply a control current to control coils of FRPMG 24. The application of the control current magnetically saturates shunts to reduce shunting of the air gap magnetic flux. This increases the magnetic flux linkage between permanent magnets of FRPMG 24 and stator coils of FRPMG 24, which increases the generated electromagnetic force (EMF) and electromagnetic torque to control the output voltage.

In the embodiment illustrated in FIG. 1, PMG 26 provides power to voltage regulator 28 and may be driven by the same shaft 38 as FRPMG 24. PMG 26 is any generator capable of providing power to voltage regulator 28 based upon the mechanical energy transferred through shaft 38. In other embodiments, voltage regulator 28 may be powered using any other desirable method. Sensors 30 sense, for example, the current and the voltage on VVVF buses 42a and 42b. Sensors 30 may be implemented as, for example, any current sensors and/or voltage sensors. The frequency and voltage on VVVF buses 42a and 42b are adjusted by voltage regulator 28 based upon the sensed values from sensors 30. Voltage regulator 28 controls FRPMG 24 to maintain, for example, a constant voltage-to-frequency (V/Hz) ratio on VVVF buses 42a and 42b. Voltage regulator 28 is configured to maintain the constant V/Hz ratio at any desired value based upon the characteristics of prime mover 16 and engine accessories 14a-14c.

Power having a constant V/Hz ratio on VVVF buses 42a and 42b may utilized to drive IMs 46a-46c of engine accessories 14a-14c. The torque for an IM may be determined based upon the V/Hz ratio of the power provided on VVVF buses 42a and 42b to the IM 46a-46c. Failure to maintain a constant V/Hz ratio may affect motor torque, temperature, speed, and current draw. If the air-gap flux of the induction motor is maintained constant by controlling the V/Hz ratio, the motor can deliver its rated torque. Therefore, it is desirable to maintain a constant V/Hz ratio when supplying power to a motor to maintain a rated motor torque. Past systems utilized motor controllers to control power from constant voltage variable frequency buses to the induction motors of aircraft accessories to maintain rated motor torque. By controlling FRPMG 24 to output a constant V/Hz ratio on VVVF buses 42a and 42b, the motor controllers of past systems may be eliminated from engine accessories electric system 22. This reduces the size and weight of engine accessories electric system 22 and increases the efficiency of system 10.

Variation in speed of prime mover 16 causes a proportional variation of the output voltage and frequency of FRPMG 24. By designing FRPMG 24 and IMs 46a-46c such that the output voltage and frequency of FRPMG maintains the air-gap flux of IMs 46a-46c at a desired value during steady-state operation, the speed of IMs 46a-46c can be controlled closely proportional to the speed of prime mover 16. As the speed of prime mover 16 increases, the stator voltage and frequency of IMs 46a-46c proportionally increases, maintaining a constant V/Hz ratio.

LMD module 32 receives the VVVF power with the constant V/Hz ratio from FRPMG 24 on VVVF buses 42a and 42b. Each accessory 14a-14c receives power from redundant respective power lines 48a-48c and 50a-50c. LMD module 32 includes SSPCs 44a-44c to control power to accessories 14a-14c. Redundant power is provided on power lines 48a-48c and 50a-50c to provide fault control and isolation. IMs 46a-46c may receive, for example, three-phase inputs to drive the motor. In this case, each redundant line 48a-48c an 50a-50c includes three phase lines. In the event of a fault, LMD module 32 may control, for example, SSPCs 44a-44c to terminate and/or isolate the faulty load. LMD module 32 may be implemented as any electronic or electromechanical circuit, and may include, for example, analog and/or digital components.

Figure 2:
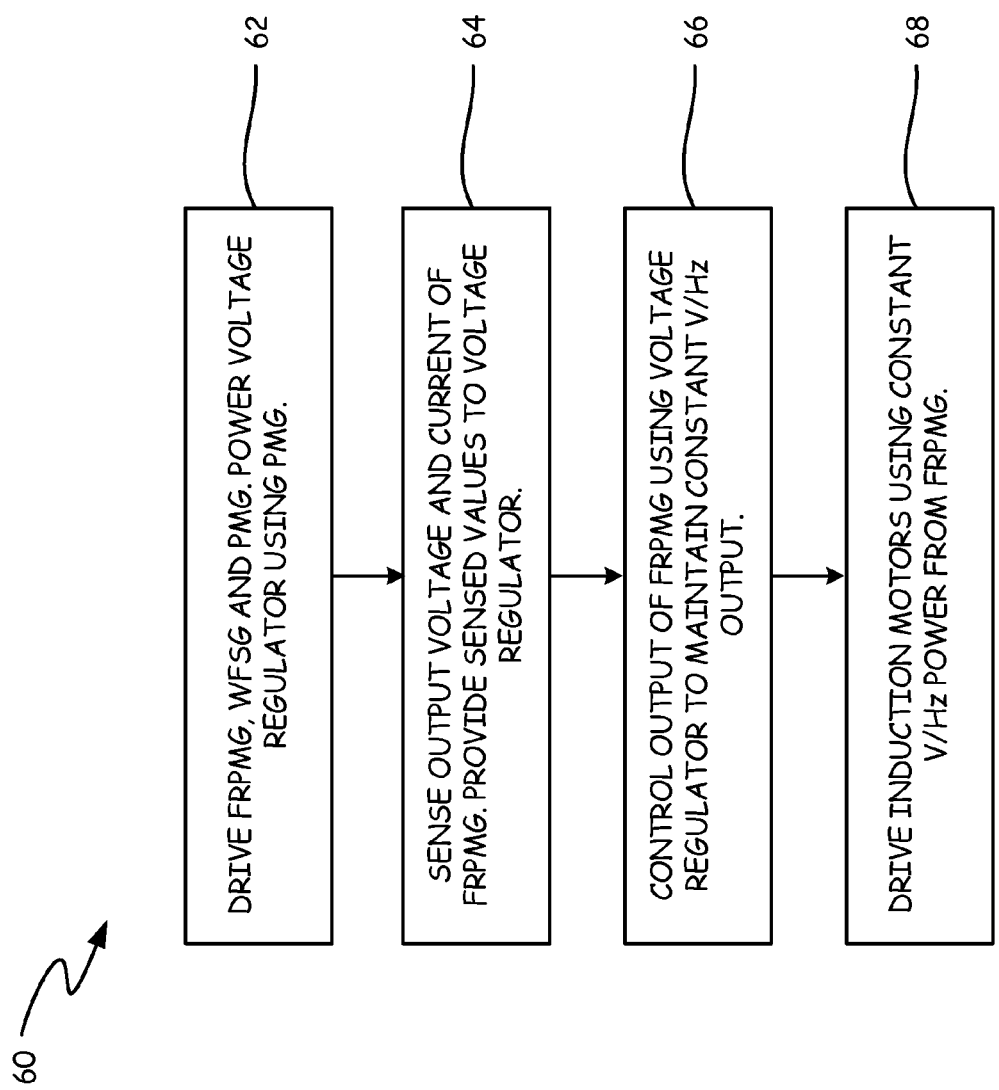
FIG. 2 is a flowchart illustrating a method of controlling a flux regulated permanent magnet generator for providing power to engine accessories.

With continued reference to FIG. 1, FIG. 2 is a flowchart illustrating method 60 of controlling FRPMG 24 for providing power to engine accessories 14a-14c. At step 62, prime mover 16 drives FRPMG 24 through gearbox 18. PMG 26 is also driven by prime mover 16 to provide initial power to voltage regulator 28. At step 64, voltage and current are sensed by sensors 30 on VVVF buses 42a and 42b and the sensed values are provided to voltage regulator 28. At step 66, voltage regulator 28 controls FRPMG 24 to output a constant V/Hz ratio. The constant V/Hz ratio is any desirable value based upon the speed of gas turbine engine and IMs 46a-46c. At step 68, power is provided from FRPMG 24 at a constant V/Hz ratio to IMs 46a-46c to drive accessories 14a-14c.

Discussion of Possible Embodiments

The following are non-exclusive descriptions of possible embodiments of the present invention.

An electric system includes a flux regulated permanent magnet generator configured to provide power for an accessory electric system. The accessory electric system includes an engine accessory and a voltage regulator. The engine accessory includes an induction motor that receives power from the flux regulated permanent magnet generator. The voltage regulator is configured to control an output of the flux regulated permanent magnet generator to maintain a constant voltage-to-frequency ratio.

The electric system of the preceding paragraph can optionally include, additionally and/or alternatively, any one or more of the following features, configurations and/or additional components:

A further embodiment of the foregoing electric system, wherein the accessory electric system further includes a sensor that senses an output condition indicative of the output of the flux regulated permanent magnet generator. The voltage regulator controls the output of the flux regulated permanent magnet generator based upon the output condition.

A further embodiment of any of the foregoing electric systems, wherein the accessory electric system further includes an auxiliary permanent magnet generator configured to provide power to the voltage regulator. The auxiliary permanent magnet generator and the flux regulated permanent magnet generator are driven by a common shaft.

A further embodiment of any of the foregoing electric systems, wherein the sensor comprises a current sensor and a voltage sensor.

A further embodiment of any of the foregoing electric systems, further including a gearbox and a wound field synchronous generator. The gearbox drives the wound field synchronous generator through a first shaft, and the gearbox drives the flux regulated permanent magnet generator through a second shaft.

A further embodiment of any of the foregoing electric systems, wherein the flux regulated permanent magnet generator and the wound field synchronous generator are driven by a gas turbine engine.

A further embodiment of any of the foregoing electric systems, wherein the accessory electric system further includes first and second power buses connected to provide power from the flux regulated permanent magnet generator to the load management module, and a load management module configured to control power from the flux regulated permanent magnet generator to the first engine accessory.

A further embodiment of any of the foregoing electric systems, wherein the accessory electric system further includes a second engine accessory that includes a second induction motor.

A further embodiment of any of the foregoing electric systems, wherein the load management module includes a plurality of solid state power controllers that control power provided from the first and second power buses to the first and second engine accessories.

A method includes driving, by a gas turbine, a flux regulated permanent magnet generator and providing, by the flux regulated permanent magnet generator, output power to a plurality of engine accessories. The output power has a power frequency and a power voltage. The method also includes controlling, using a voltage regulator, the power voltage of the flux regulated permanent magnet generator to maintain a constant ratio between the power voltage and the power frequency.

The method of the preceding paragraph can optionally include, additionally and/or alternatively, any one or more of the following features, configurations and/or additional components:

A further embodiment of the foregoing method, further including driving, by the gas turbine engine, a wound field synchronous generator, and providing, by the wound field synchronous generator, load power to a plurality of aircraft loads.

A further embodiment of any of the forgoing methods, further including driving the plurality of engine accessories using a plurality of induction motors, and controlling the output power from the flux regulated permanent magnet generator to the plurality of induction motors using a plurality of solid state power controllers.

A further embodiment of any of the forgoing methods, further including providing, by an auxiliary permanent magnet generator, power to the voltage regulator.

A further embodiment of any of the forgoing methods, wherein driving, by the gas turbine engine, the flux regulated permanent magnet generator comprises driving the flux regulated permanent magnet generator using a gearbox. The flux regulated permanent magnet generator and the auxiliary permanent magnet generator are driven by a common shaft.

A further embodiment of any of the forgoing methods, further including sensing a sensed condition of the output power of the flux regulated permanent magnet generator. Controlling, using the voltage regulator, the output voltage of the flux regulated permanent magnet generator comprises controlling the output voltage based upon the sensed condition.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric system comprising:
   a flux regulated permanent magnet generator;
   a first engine accessory that includes a first induction motor;
   first and second power buses connected to provide power from the flux regulated permanent magnet generator to the first engine accessory; and
   a voltage regulator that controls a magnetic flux present in the flux regulated permanent magnet generator to control an output of the flux regulated permanent magnet generator to maintain a constant voltage-to-frequency ratio.

2. The electric system of claim 1, wherein the electric system further comprises:
   a sensor that senses an output condition indicative of the output of the flux regulated permanent magnet generator, wherein the voltage regulator controls the output of the flux regulated permanent magnet generator based upon the output condition.

3. The electric system of claim 2, wherein the electric system further comprises:
   an auxiliary permanent magnet generator configured to provide power to the voltage regulator, wherein the auxiliary permanent magnet generator and the flux regulated permanent magnet generator are driven by a common shaft.

4. The electric system of claim 2, wherein the sensor comprises a current sensor and a voltage sensor.

5. The electric system of claim 1, further comprising:
   a gearbox; and
   a wound field synchronous generator, wherein the gearbox drives the wound field synchronous generator through a first shaft, and wherein the gearbox drives the flux regulated permanent magnet generator through a second shaft.

6. The electric system of claim 5, wherein the flux regulated permanent magnet generator and the wound field synchronous generator are driven by a gas turbine engine.

7. The electric system of claim 1, wherein the electric system further comprises:
   a load management module configured to control power from the first and second power buses to the first engine accessory.

8. The electric system of claim 7, wherein the electric system further comprises a second engine accessory that includes a second induction motor.

9. The electric system of claim 8, wherein the load management module includes a plurality of solid state power controllers that control power provided from the first and second power buses to the first and second engine accessories.

10. A method comprising:
    driving, by a gas turbine, a flux regulated permanent magnet generator;
    providing, by the flux regulated permanent magnet generator, output power to a plurality of engine accessories through first and second power buses, wherein the output power has a power frequency and a power voltage; and
    controlling, using a voltage regulator, a magnetic flux present within the flux regulated permanent magnet generator to maintain a constant ratio between the power voltage and the power frequency.

11. The method of claim 10, further comprising:
    driving, by the gas turbine, a wound field synchronous generator; and
    providing, by the wound field synchronous generator, load power to a plurality of aircraft loads.

12. The method of claim 10, further comprising:
    driving the plurality of engine accessories using a plurality of induction motors; and
    controlling the output power from the first and second power buses to the plurality of induction motors using a plurality of solid state power controllers.

13. The method of claim 10, further comprising:
    providing, by an auxiliary permanent magnet generator, power to the voltage regulator.

14. The method of claim 13, wherein driving, by the gas turbine, the flux regulated permanent magnet generator comprises driving the flux regulated permanent magnet generator using a gearbox, wherein the flux regulated permanent magnet generator and the auxiliary permanent magnet generator are driven by a common shaft.

15. The method of claim 10, further comprising:
sensing a sensed condition of the output power of the flux regulated permanent magnet generator;
wherein controlling, using the voltage regulator, the magnetic flux present within the flux regulated permanent magnet generator comprises controlling the magnetic flux present within the flux regulated permanent magnet generator based upon the sensed condition.

\* \* \* \* \*